United States Patent [19]

Yamawaki, deceased et al.

[11] Patent Number: 4,536,025
[45] Date of Patent: Aug. 20, 1985

[54] PACKAGE TRAY TRIM DEVICE FOR VEHICLES

[75] Inventors: Takesi Yamawaki, deceased, late of Okazaki, Japan, by Hiroko Yamawaki, representative; Masakazu Kusuhara; Tatuya Saitou, both of Toyota, Japan

[73] Assignee: Toyota Jidosha Kabushiki Kaisha, Japan

[21] Appl. No.: 520,593

[22] Filed: Aug. 5, 1983

[30] Foreign Application Priority Data

Oct. 4, 1982 [JP] Japan .......................... 57-151171[U]

[51] Int. Cl.$^3$ ................................. B60R 5/04
[52] U.S. Cl. ................................. 296/37.16; 296/37.5; 160/129
[58] Field of Search ............... 296/76, 37.5, 37.8, 296/37.16, 98, 100; 160/127, 128, 129, 130, 181, 210

[56] References Cited

U.S. PATENT DOCUMENTS 3,446,528  5/1969  Peters ............................... 296/63 X
4,443,034  4/1984  Beggs ............................ 296/37.16 X

FOREIGN PATENT DOCUMENTS 41016    12/1981  European Pat. Off. .............. 296/76
2921813  12/1979  Fed. Rep. of Germany ... 296/37.16
2452571  11/1980  France ............................ 296/37.16
57-537    5/1981  Japan ............................... 296/37.8

Primary Examiner—David A. Scherbel
Assistant Examiner—Russell D. Stormer
Attorney, Agent, or Firm—Parkhurst & Oliff

[57] ABSTRACT

A package tray trim device for use in a vehicle for concealing baggage loaded in a space behind the rear seat. The package tray trim device comprises a front plate which is foldable and a second plate which is stationary and located rearward of the front plate. Further, the front plate comprises a main part having a first fixing element secured on its back face and a return extension having a second fixing element on its outward face whereby the first fixing element engages with the back face of the return extension to conceal the baggage from outside viewing, when the first plate is not folded, and the second fixing element engages with a deck carpet on the deck behind the rear seat when the first plate is downwardly folded.

8 Claims, 5 Drawing Figures

PACKAGE TRAY TRIM DEVICE FOR VEHICLES

BACKGROUND OF THE INVENTION

The present invention relates to a package tray trim device for a vehicle, and more particularly to a device which conceals baggage loaded into a space behind the rear seat.

A previously known structure of a package tray trim device for concealing baggage loaded into a space behind the rear seat is disclosed in FIGS. 4 and 5.

The first plate 200 of the package tray trim T, located behind the rear seat 6, was adapted to be downwardly folded from its two-dot chain line position to the solid line position as indicated in FIG. 4. The package tray trim T comprising the first plate 200 and a second plate 1, which is mounted at its lateral ends to the vehicle body, can be folded along the indicated line 11. In order to fasten the first plate 200 to the deck carpet 4, which functions as a cushion for the baggage, a fastening device was provided on a back face of plate 200. The fastening device comprises a fastening rod 210, biasing means such as spring 211 for an upward biasing of the fastening rod 210, an end plate 212 which is secured to the fastening rod 210 at its bottom end, and a stopper plate 40 having an opening 41 which is secured to the deck carpet 4. By utilizing this construction, the operation of fastening is accomplished by the following procedure: the end plate 212 is downwardly displaced by a force exerted against the biasing force of spring 211, as indicated by arrow A in FIG. 5, and inserted into the opening 41 of the stopper plate 40. After the insertion, the end plate 212 is rotated in a clockwise direction as indicated by arrow B in FIG. 5. Through this operation, the first plate 200 becomes fastened to the deck carpet 4.

This known structure has several disadvantages. The operation of fastening and unfastening is complicated, the total weight of a package tray trim device is increased by the use of the fastening rod 210 and the stopper plate 40, and the cost of the entire vehicle which incorporates this device is increased.

SUMMARY OF THE INVENTION

The present invention was made in view of the foregoing background and to overcome the above discussed drawbacks. It is accordingly an object of this invention to provide a simple package tray trim device for a vehicle to conceal baggage which is loaded into a space behind the rear seat.

To attain the above objects, a device according to the present invention comprises:
 a deck behind the rear seat;
 a deck carpet placed on the deck for purposes of cushioning baggage thereon;
 a package tray trim cover for concealing the baggage from outside viewing and defining a space between the rear seat and the deck including:
  a foldable first plate which is forwardly located behind the rear seat in the vehicle;
  a stationary second plate which is attached at its lateral ends to the body of the vehicle, and is located rearwardly behind the rear seat;
  a hinge located between the first plate and the second plate whereby the first plate is downwardly foldable at the hinge;
  the first plate comprising:
   a main part having a first fixing means secured on its back face; and
   a return extension having a second fixing means on its outward face,
   whereby the first fixing means engages with the back face of the extension to conceal the baggage from the outside, when the first plate is not folded, and the second fixing means engages with the deck carpet when the first plate is downwardly folded.

BRIEF DESCRIPTION OF THE DRAWINGS

The above objects, features and advantages of the present invention will become more apparent from reading the following description of the preferred embodiments taken in connection with the accompanying drawings, wherein.

DETAILED DESCRIPTION OF THE PREFERRED EMBODIMENTS

The present invention is decribed in detail with reference to the accompanying drawings which illustrate different embodiments of the present invention.

Figure 1:
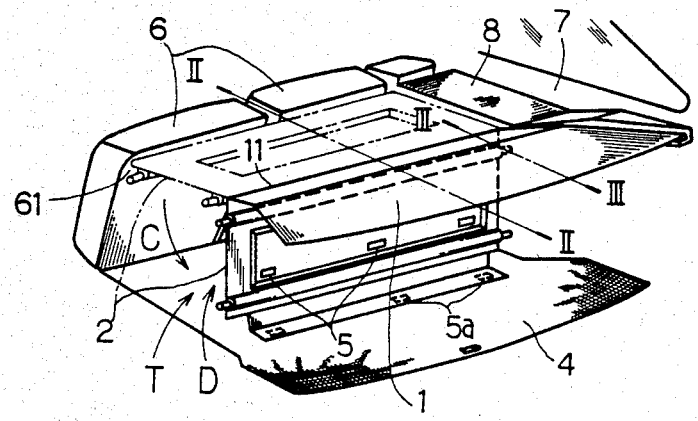
FIG. 1 is a perspective view of an embodiment according to the present invention.

Referring first to FIG. 1, there is shown a perspective view of a package tray trim device T according to the present invention.

In all figures, similar reference characters are used to designate like or corresponding parts throughout.

Figure 2:
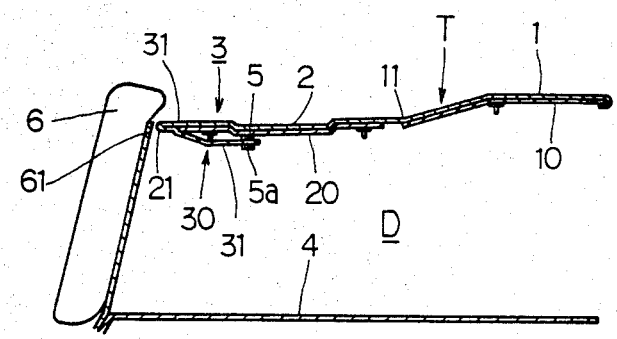
FIG. 2 is a cross-sectional view taken along line II—II of FIG. 1.

In a typical vehicle the rear seats 6 are separately foldable towards the front of the vehicle. On the rear face of each seat 6, a seat frame 61 is attached. A deck space D is provided between the seat frame 61 and the rear window (not shown in drawings). The package tray trim T is provided in the deck space D for concealing baggage placed on the deck. The package tray trim comprises a front foldable plate 2 located adjacent to the rear seat 6 and connected to the rear plate 1, which is secured to the vehicle by the package side bracket 8. The side bracket 8 is secured onto the vehicle body in a location adjacent to the rearward side window. Individual trim boards 20,10 are provided separately to reinforce plates 2, 1 respectively. Trim board 20 is attached to the back side of front plate 2, and trim board 10 is attached to the back side of back plate 1. The top faces of front plate 2 and rear plate 1 are uniformly covered by trim cover 3. Front plate 2 can be downwardly folded about the hinge line 11. Furthermore, front plate 2 is comprised of a main part, and a trim cover extension 30 whose outward face 31 looks towards the deck carpet 4. FIG. 2 shows that the inward face 32 of the trim cover extension 30 is fastened to the underside of the trim board 20, which can be accomplished by any of a variety of first fixing means 5, such as magic tape Velcro, or the like. This same plurality of fixing means can be applied to attachment 5a. For example, magic tape which has been machine sewed onto the outward face 31 of the trim cover extension 30 of front plate 2 would attach to deck carpet 4, when front plate 2 is downwardly folded as shown on FIG. 3.

By utilizing the above-described construction, the operation of the device is as follows: in order to load tall baggage into the deck space D behind the rear seat, the front plate 2 is downwardly rotated around the hinge line 11 from the two-dot chain line position to the solid line position as indicated by arrow C in FIG. 1.

FIG. 2 illustrates the normal position of the package tray trim T which spans and encloses deck space D, with the return extension 30 of front plate 2 rearwardly folded and fixed. The first fixing means 5, such as magic tape secured onto the trim board 20, engages with the inward face of the return extension 30, thereby fastening it to trim board 20. From this position, the front plate 2 is downwardly folded permitting tall baggage to be stowed in deck space D. The engagement between the first fixing means 5 and the back face of the return extension 30 is interrupted by the downward pulling of the return extension. Next, the front plate 2 is downwardly folded at the intermediate line 11 and the second fixing means 5a is engaged with the fiber of the deck carpet 4 as shown in FIG. 3.

Figure 3:
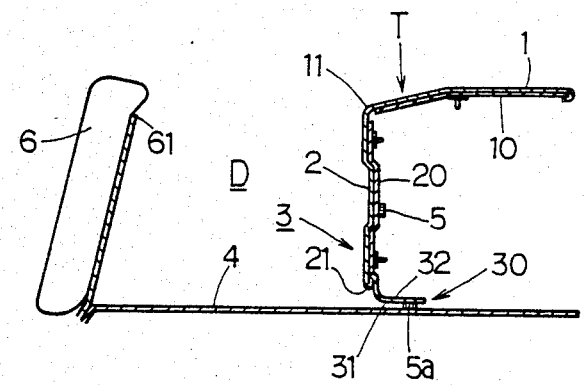
FIG. 3 is a cross-sectional view taken along line III—III of FIG. 1.
Figure 4:
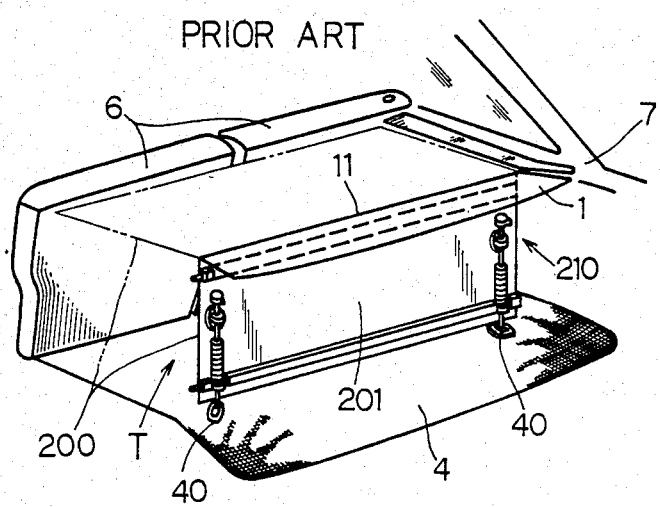
FIG. 4 is a perspective view of a package tray trim device according to prior art.
Figure 5:
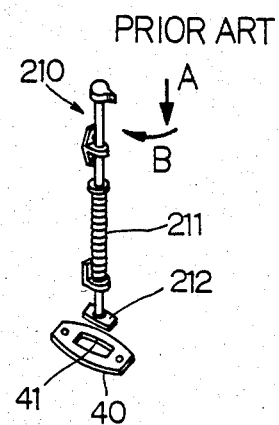
FIG. 5 is an enlarged view of the fastening device disclosed in FIG. 4.

Furthermore, the reverse operation from the condition of FIG. 3 to the condition of FIG. 2 is accomplished by the above-described steps, but in reverse order and directions.

In addition to the above-described operation, the entire package tray trim device T is detachable from the vehicle body for permitting large baggage to be placed in deck space D.

While the present invention has been described in its preferred embodiments, it is to be understood that the invention is not limited thereto but may be otherwise embodied within the scope of the following claims.

What is claimed is:

1. A package tray trim device for a vehicle for the concealment of baggage stowed in a space behind a rear seat, comprising:
    a deck behind said rear seat of a vehicle;
    a deck carpet covering said deck for cushioning said baggage thereon;
    a package tray trim cover for concealing said baggage from outside viewing and defining a space between said rear seat and said deck, including:
    a foldable first plate which is located just behind the rear seat of the vehicle,
    a stationary second plate which is attached at its lateral ends to a vehicle body, and is located rearwardly behind the rear seat,
    a hinge member connecting said first plate and said second plate for permitting said first plate to be downwardly folded at the hinge member,
    said first plate comprising:
        a main part having first fixing means secured on its back side, said back side facing said deck when said first plate is not folded; and
        a return extension having second fixing means on an outward face thereof, said outward face being disposed opposite a inward face of said extension, said inward face of said extension facing said back side of said main part when said first plate is not folded,
    whereby said first fixing means engages with the inward face of said extension to conceal baggage from outside viewing when said first plate is not folded, and said second fixing means engages with said deck carpet to hold said first plate in place when said first plate is folded downwardly.

2. The device of claim 1, wherein a trim board is secured to and covers a back side of said package tray trim cover, but does not cover the axis of said hinge member.

3. The device of claim 2, wherein the first fixing means is secured to said trim board.

4. The device of claim 1, wherein a plurality of said first fixing means are fixed laterally to said first plate.

5. The device of claim 1, wherein a plurality of said second fixing means are fixed laterally to said return extension.

6. The device of claim 1, wherein said first fixing means is magic tape.

7. The device of claim 5, wherein said second fixing means is magic tape.

8. The device of claim 1, wherein said package tray trim device is detachable from the vehicle body.

* * * * *